July 27, 1937.　　　　A. C. ZIMMERMAN　　　　2,088,104
WATER SOFTENER
Filed April 6, 1931　　　　2 Sheets-Sheet 2
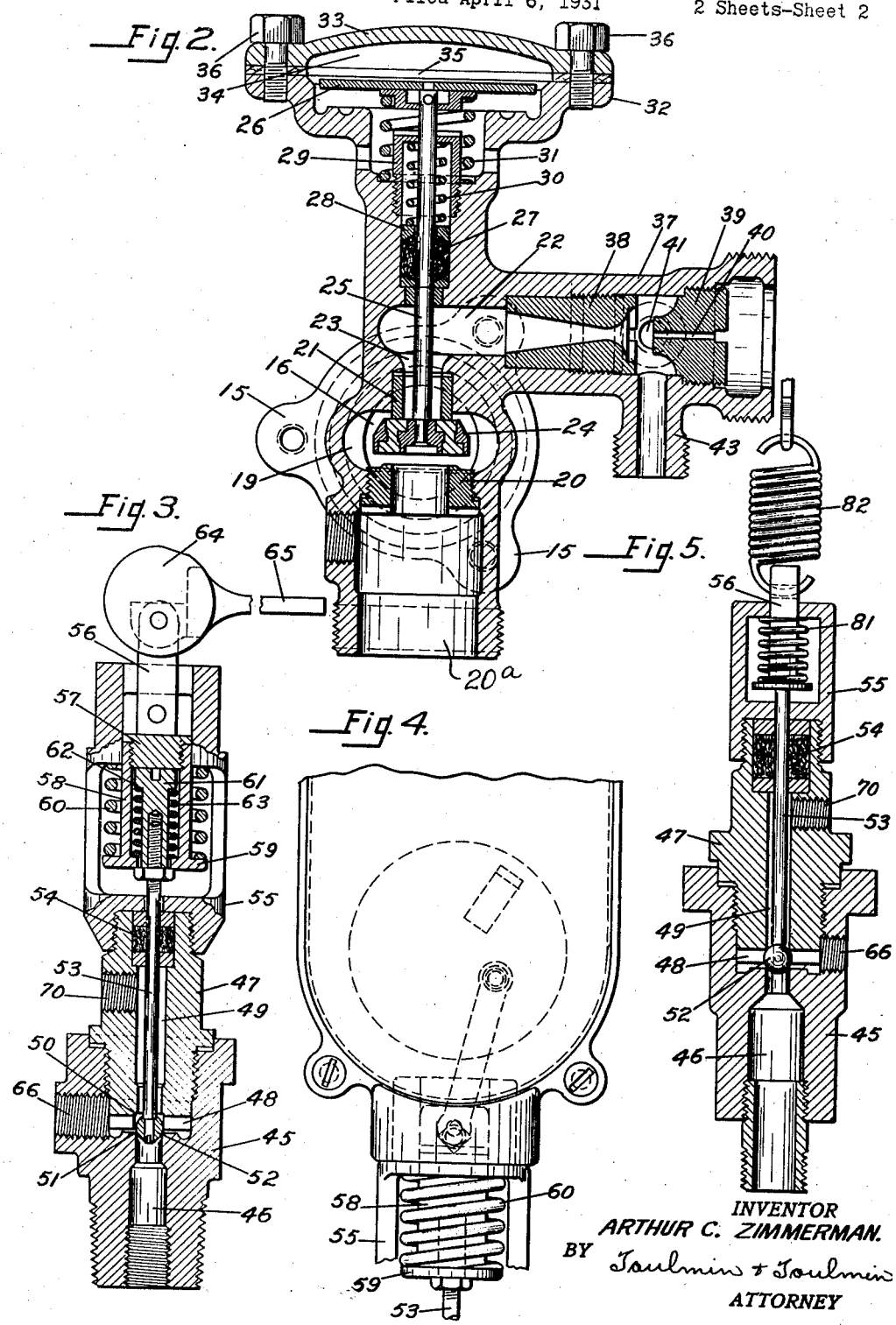
INVENTOR
ARTHUR C. ZIMMERMAN.
BY Toulmin & Toulmin
ATTORNEY Patented July 27, 1937

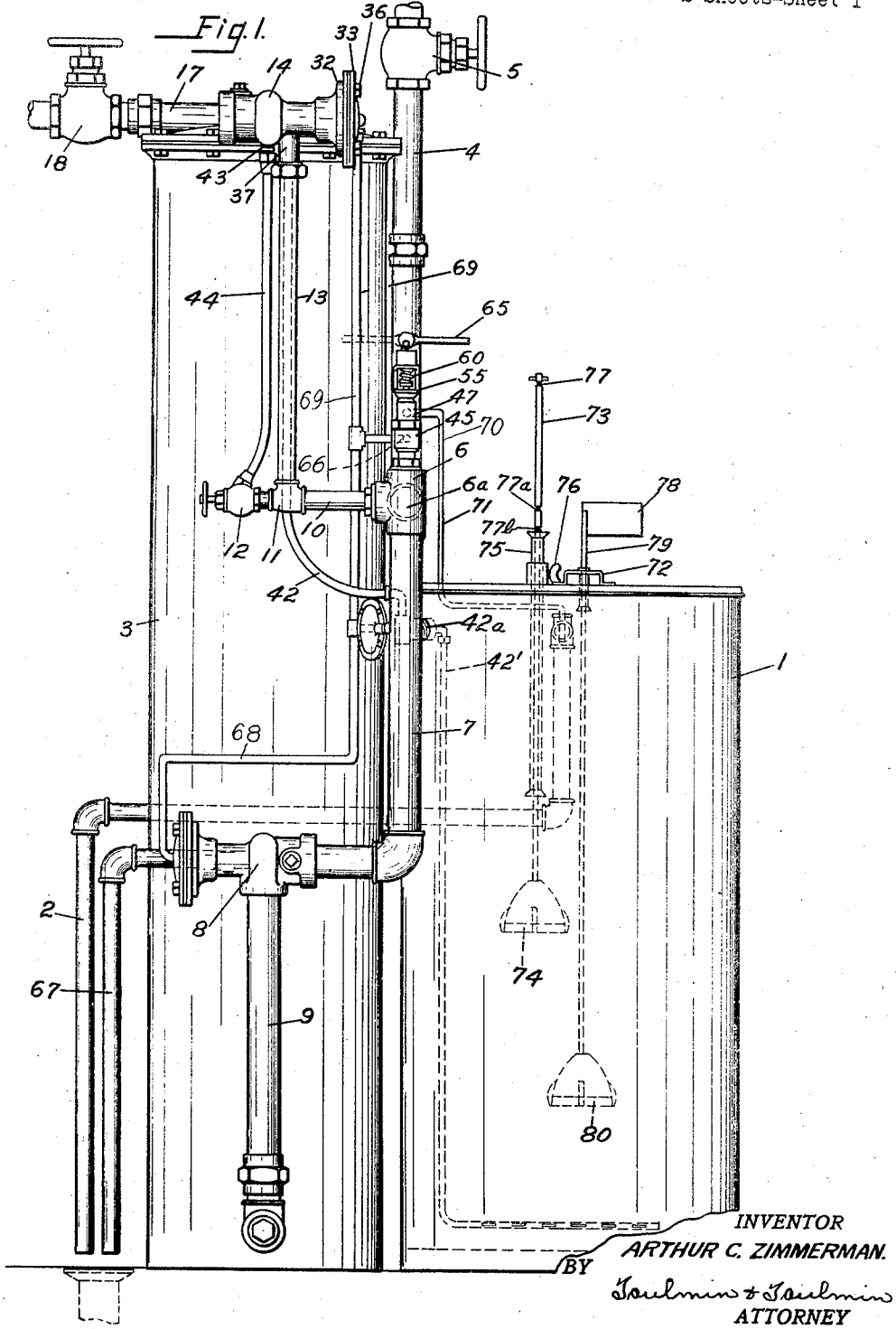

2,088,104

UNITED STATES PATENT OFFICE 2,088,104

WATER SOFTENER

Arthur C. Zimmerman, Dayton, Ohio, assignor to The Duro Company, Dayton, Ohio, a corporation of Ohio Application April 6, 1931, Serial No. 527,875

3 Claims. (Cl. 210—24)

The invention relates to water softeners, and has for its object to provide a water softener in which the flow of water into the regenerating tank is controlled by a valve mechanism having a connection with a hard water supply line, the tank, and a discharge line with a single valve in the valve mechanism to determine the flow of water into the tank and the discharge of water therefrom.

It is also an object of this invention to provide, in connection with a hard water inlet pipe to the regenerating tank, a single valve means for controlling pressure for operating other valves for controlling the flow of water from the brine line to the tank and from the tank to the service line or to a waste pipe. The pressure control valve consists of a casing having an outlet leading to pressure chambers and to a second outlet leading to a drain pipe and a single valve located so that in one position the hard water will be directed to the pressure chambers, while in another position the water from the pressure chambers will be discharged into the drain pipe.

It is also an object of this invention to provide, in connection with a regenerating tank, a valve casing having therein three inlets or outlets and a single valve for controlling the direction of the water through the inlets and outlets.

It is also an object of this invention to provide, in connection with a water softening tank, a brine tank having therein a float by which the amount of brine discharged at any time may be determined, and by which the amount of refill water may be determined and so graduated that after each regeneration the brine tank is refilled to a definite extent not equal to the amount of brine used for regenerating purposes, so that after each regeneration the amount of brine in the tank is less than at the beginning of the regeneration through a succession of regenerations, amounting to about ten, after which the brine tank is resupplied with solid salt. By this means the tank will not overflow when supplied with solid salt.

By this means the brine can be slowly drawn over a long period of time, thereby causing a long brine contact with the mineral in the regenerating tank, followed by a rapid washing out of short duration. In this way a softening is obtained in approximately thirty minutes, which under ordinary means, requires approximately one hour.

It is also an object of this invention to provide, in connection with the brine tank, a float means to indicate the amount of brine in the brine tank.

These and other advantages will appear from the following description taken in connection with the drawings.

Referring to the drawings:

Figure 1 is a side elevation of the apparatus assembled for use.

Figure 2 is a horizontal section through the valve mechanism located at the top of the softening tank.

Figure 3 is a vertical, longitudinal section through the valve for controlling the pressure from the main hard water line to the valve mechanisms located at the top and adjacent the bottom of the tank.

Figure 4 is a view showing part of an automatic means for releasing the valve shown in Figure 3 after it has been set for regenerating purposes.

Figure 5 is a longitudinal section through a slightly modified form of valve for controlling the direction of hard water pressure to the valve mechanisms.

Figure 1 shows the hard water softener assembled in operating condition. In this figure the brine tank is indicated by the numeral 1, and has therein extending from a point adjacent the top and to a point outside thereof, an overflow pipe 2. This pipe determines the height to which the water can attain in the tank, and also serves as a drain for receiving the pressure water released from the valve mechanisms. The softening tank located adjacent the brine tank is indicated by the numeral 3.

For the purpose of supplying hard water there is a hard water pipe 4, which has therein a valve 5 for cutting off the water. At the lower end of this pipe is a T-connection 6. The T part of the connection is connected to the hard water pipe 4. There is also attached to this connection a pipe 7, which extends downwardly from the connection toward the bottom of the softening tank. This pipe extends into the chamber of a diaphragm-operated valve, the construction of which is hereinafter described. From the valve 8 a pipe 9 extends downwardly to the bottom of the tank and enters the tank at the bottom. There is also attached to the T-connection 6 a horizontally disposed pipe 10.

Whenever the valve 5 is open hard water is in pipes 4, 7 and 10 at all times during the operation of the apparatus. There is also connected to the other end of the pipe 10 from the T-connection 6 a T-connection 11, to one part of which a refill valve 12 is attached, and to another part of which a pipe 13 is attached and extends upwardly, and is attached at its upper end to an extension 37, to be described later.

On top of the softening tank 3 is a valve, generally designated 14, forming part of the upper valve mechanism. This valve 14 is supported on top of the tank by means of legs 15, and is attached thereto in any suitable manner. This valve 14 has a connection 16 with the tank 3, forming an open passageway by which liquid can pass from the tank into the valve, or from the valve 14 into the tank. There is also attached to this valve by a suitable means a service pipe 17, which may be closed by means of a valve 18.

The valve 14 has a chamber 19, on each side of which is a valve seat, one designated by the numeral 20, adjacent the outlet from the chamber into the service pipe; the other 21 adjacent the opening from the chamber into a chamber 22 connected to the first-named chamber 19 by means of a passageway 23. The valve member 24 for controlling the flow of water from the chamber 19 is adapted to be seated against either one of the two valve seats. When this valve member 24 is seated against the valve seat 21 the passageway between the two chambers is closed, thereby leaving a passageway open from the softening tank to the service pipe or line. When this valve member 24 is seated against seat 20 the passageway 23 is open so that water may pass from the chamber 22 into the tank, but water cannot pass from the tank out through the service line.

For operating the valve member 24 a stem 25 extends therefrom out through suitable openings in the end of the valve casing. On the end of this stem, remote from the valve member 24, is a plate 26. For the purpose of preventing the flow of water around the stem there is provided in the valve casing a packing 27, which is held in place by means of a gland 28 fitting around the stem. This gland is held in place by means of a spring 30 inclosed in a cup 29, threaded into the valve casing and forming a housing for the spring. Around this cup member is a second spring 31, seated at one end on a shoulder formed in the valve casing and having its other end engaging on one side of the plate 26. This spring is just sufficient to hold the plate in the position shown in Figure 2, with the valve closed.

The end of the valve casing adjacent the plate 26 is flared, as indicated by the numeral 32, and has attached thereto a cap 33 which provides a chamber 34, to which pressure is admitted from the hard water line for operating the valve 24. Between the flared end 32 and the cap 33 is a diaphragm 35 which rests upon the upper surface of the plate 26. The diaphragm is held in place by the cap member 33, which is attached to the flared part 32 by means of screws 36. The pressure chamber is between the diaphragm and the cap 33 so that whenever water is admitted into this chamber the diaphragm is forced inwardly, thereby moving with it the stem 25 and the valve member 24 to shift the position of the latter. Under normal conditions the valve member 24 is seated on the valve seat 21, thereby closing the passageway between the two chambers in the valve casing.

Extending from the valve casing of the valve 14 is an extension 37, which is hollow and open to the chamber 22. In one part of this extension is threaded a Venturi plug 38. One part of this plug has a very restricted opening, gradually expanding as it approaches the chamber 22. This Venturi plug is located substantially in the center of the extension 37. There is also in this extension a plug 39, suitably threaded thereinto and spaced from the Venturi plug. This plug has a small opening 40. On the end of the extension the pipe 13 is attached by suitable coupling means, usually used for purposes of this kind.

The valve 8 is similar in construction to the valve 14 described above, and contains a similar diaphragm 35 operating a similar double-acting valve member 24. In the valve 8, however, the Venturi injector devices within the extension 41 are omitted. The waste pipe 67 is connected to the upper chamber 22 of the valve 8, the tank pipe 9 to the middle chamber 19 and the hard water pipe 7 to the lower chamber 20a thereof (Figures 1 and 2).

Extending at right angles to the extension 37 is a projection having an opening 41. To this projection a brine pipe 42 is attached at one end, the other end of which is attached to a diaphragm-operated brine valve 42a. In the brine tank and extending to the bottom of the brine tank and across the bottom is a second brine pipe 42', attached at one end to the chamber of the diaphragm-operated brine valve 42a. The lower end of this brine pipe is bent at right angles to the part attached to the valve casing, and has therein a plurality of small openings through which the brine passes into the pipe. Also extending from the projection 37 is a second extension 43, to which one end of a refill pipe 44 is attached, the other end of which is attached to the refill valve 12.

The pipes 7 and 10 are attached to two parts of the T-connection 6. Attached to the other part, and in line with pipe 7, is a plug 45, which has an opening 46 therein forming a passageway continuous with the passageway through the coupling into pipe 7 so that hard water may pass from the coupling into the passageway 46. The upper end of this plug has an opening in which there is a plug 47, forming with the plug 45 a chamber 48. In this plug 47 is a long chamber 49 substantially the full length of this plug 47.

In the chamber 48 are two valve seats adapted to receive the same valve in different positions. One of these seats 50 is at the lower end of chamber 49; the other 51 is at the upper end of the passageway 46. In chamber 48 is a ball valve 52 adapted to rest in either one of these seats. Normally this valve rests in seat 51. Extending upwardly from the valve 52 is a valve stem 53. This stem extends through the chamber 49 and passes through a packing 54, which prevents water from leaking from the chamber 49. On the end of plug 47 there is threaded a casing 55, into which the valve stem extends.

The upper end of this casing is hollow and has extending thereinto a stem 56, attached at its lower end to a plug 57, which is threaded into the upper end of a housing 58. Around the lower end of the housing 58 is a shoulder 59, against which one end of a spring 60 engages, while the other end of the spring engages a shoulder formed on the upper end of the casing 55. This spring tends to hold the housing in a lower position, as shown in Figure 3.

In the housing is a head 61 threaded on the upper end of the valve stem 53. On the upper end of this head is a shoulder 62, against which the upper end of a spring 63 engages, while the lower end engages a flange on the lower end of the housing 58. By this means there is provided between the stem 56 and the valve stem 53 a double spring connection so that whenever the stem 56 is elevated both springs are compressed in elevating the valve stem 53 and the valve 52 thereon. For elevating the stem 56 there is provided on the end thereof a cam disc 64, rotatably and eccentrically mounted on the end of the stem and adapted to engage the upper surface of the casing 55 for operating the valve 52.

Extending from the cam disc is a handle 65. In the position shown in Figure 3 the valve 52 is held seated in seat 51, whereas if the handle 65 were shifted to a left-hand position the valve would be elevated so that water may pass from the hard water line up through passageway 46, out through a pipe connected to an opening 66. The pressure pipe in the opening 66 branches into two directions, a branch line 69 proceeding upwardly for connection with the chamber 34 of the valve mechanism within the valve casing 14 located on top of the tank 3, while the other branch line 68 proceeds downwardly to the valve mechanism for operating the brine valve 42a and continues onward to the lower valve mechanism for operating the valve 8.

Leading from the chamber 49 is an opening 70 to which a bleed line pipe 71 is attached at one end, the other end of which extends into the overflow pipe 2. When the valve 52 is in the position shown in Figure 3 the hard water is cut off from the pressure lines and connection is formed so that the water used for compressing the diaphragms within the valve chambers may flow back through the bleed line into the drain line 2.

The valve mechanism indicated by the numeral 8 is the same as that located on top of the tank with the exception that it does not have the extension 31 but has instead of this extension an extension to which a waste pipe 67 is attached. The valve and chambers found in this valve mechanism are identically the same as those located in the valve mechanism at the top of the chamber, and the valve is operated in the same manner; that is, by means of pressure through the pressure pipe 68. For the purpose of removing the top from the brine tank there is provided a handle 72.

Extending into the brine tank is a float rod 73, which has on the lower end thereof a float 74. This rod moves up and down in a tube 75, adjustably supported in the top of the tank by means of a set screw 76. This rod has at its upper end a mark 77 and considerably below this mark a second refill mark 77a, and slightly below the refill mark a tube mark 77b. When the brine tank is sufficiently full of brine the tube 75 is adjusted so that the top of it is in line with the tube mark 77b. This tube may be adjusted by releasing the screw 76.

During the regenerating operation the brine is withdrawn from the brine tank until the point or mark 77 reaches the top of the tube, at which time the regenerating action is stopped and refilling begins and continues until the rod has been raised to the point where the refill mark is in line with the top of the tube 75. The tube is then again adjusted so that it is in line with the tube mark 77b.

At the beginning of this operation the tube 75 is elevated until most of the tube projects above the top of the brine tank and is gradually lowered after each act of regeneration and refilling. After about ten regenerations and refillings have taken place the brine is substantially exhausted from the tank and new solid salt is to be supplied, which can be supplied without risk of overflowing the tank. After the proper amount of salt has been supplied the tank is again refilled to the proper height, the tube 75 adjusted so that it is in line with the tube mark 77b; then another cycle of operation is ready to be carried out.

For the purpose of determining the salt in the brine tank there is provided a red flag 78 on top of a rod 79, which has on its lower end a float 80. Since after each regeneration and refill the height of the brine within the tank is substantially known the height to which the flag 78 extends determines the amount of salt in the tank.

In Figure 5 there is shown a slightly modified form of means for operating the valve 52. Instead of having two springs for controlling the valve and valve stem, there is in this case only one spring 81. Instead of having the cam 64 attached to the stem 56, a spring 82 is attached thereto at one end, and to the other end of the spring any suitable means for raising the valve and valve stem.

In Figure 4 there is shown a time mechanism for releasing the valve. In this form the valve is set manually, but after a definite period of time the valve is released by a time mechanism which causes the valve to seat.

In the operation of the water softening apparatus for softening purposes, assuming that the valve 5 is open, hard water passes through the pipe 4, which is connected at the point 6a to the T-connection 6, through the T-connection 6 and through pipe 7 to the chamber of the valve 8. The hard water from pipe 4 and T-connection 6 also passes through pipes 10 and 13 to the valve 14 at the top of the tank. Pressure is always in these pipes. When the handle 65 is in the position shown in Figure 1 water passes through pipe 7, the chamber of the valve 8 and the pipe 9 into the bottom of the tank, thence up through the water softening material within the tank 3 and is softened, whereupon it passes through opening 16 and chamber 19 of the valve 14 (Figure 2) out through the service line or soft water pipe 17. This movement of the water continues until it is desired to regenerate the water softening material in the softening tank.

To bring about regeneration of the softening material, the operator shifts the handle 65 from the full line to the dotted line position, as shown in Figure 1, thereby elevating the valve 52 so that water under pressure from the hard water pipe 4 will pass by way of the T-connection 6 and opening 46 into chamber 48, thence out through opening 66, into the pressure lines 68 and 69 to the diaphragm chambers of the valves 8, 42a and 14, whereby the valve members 24 within these valves are shifted. The water pressure within the diaphragm chamber of the valve 8 then causes its diaphragm and valve member 24 to shift, closing the connection into pipe 9 from pipe 7 and opening the connection between pipe 9 and the waste pipe 67. The water pressure within the diaphragm chamber 34 of the valve 14 meanwhile shifts the diaphragm 35 and valve member 24 from the upper position of Figure 2 to its lower position thereof, cutting off communication with the service pipe 17. The water in pipe 13 enters through the orifice 40 of valve 14 and passes through the Venturi plug 38 and into chamber 22, from which it passes through the chamber 19 and opening 16 into the tank 3.

The pressure in line 68 meanwhile has entered the diaphragm chamber of the brine valve 42a and has shifted the valve member 24 thereof to open the connection between the pipes 42' and 42 so that brine is drawn through the pipe 42', the valve 42a and the pipe 42 into the extension 37 between the plugs 38 and 39 by reason of the suction created by the injector action of the hard water from the pipe 13 in passing through the orifice 40 and Venturi plug 38 of the valve 14. The brine thus raised flows with the water from pipe 13 through chambers 22 and 19 and opening 16 of valve 14 into the tank 3 for regenerating the water softening material therein. The pressure in the tank 3 by the water arriving from pipe 13 in this manner, forces the water already in the tank 3 up through pipe 9 and the valve chamber of valve 8 and outward through pipe 67 into a drain.

To rinse the softening material and refill the brine tank after the material in the tank 3 has been sufficiently regenerated, the operator opens valve 12, but leaves valve handle 65 of valve 52 in its regeneration position, hence, leaving the settings of the valves 8, 42a and 14 unchanged from their regeneration positions, as described above. The manual opening of the valve 12 admits water from line 10 through refill pipe 44 by way of the projection 43 into the extension 37 of the valve 14 at right angles to the water entering by the opening 41 from the brine pipe 42. The water entering the projection 43 from the refill pipe 44 overcomes the suction and terminates the injection action of the plug 39 and Venturi plug 38 and passes through the opening 41 (Figure 2) into the pipe 42 thence downwardly through the valve 42a and pipe 42' into the brine tank, thereby refilling the brine tank. At the same time water also passes through the Venturi plug 39, the chamber 22, the valve seat 21, the chamber 19 and the connection 16 into the softening tank 3, where it flows downwardly, rinses the softening material and then passes outwardly through the pipe 9, the valve 8 and the drain pipe 67. After the brine tank has been refilled, as described above, so that the rod 73 rises until the point 77a is in line with the top of the tube 75, the operator closes the valve 12 and shifts the handle 65 from a left-hand position, shown in dotted lines, (Figure 1) to the right-hand position, shown in solid lines, whereupon softening again takes place in the manner previously described.

After each regeneration and refilling the tube 75 is adjusted so that it is in line with the mark 77b on the rod 73. This adjustment continues until the tube 75 rests on the support for the screw 76. A resupply of salt is then added, the tank refilled with water and the tube again readjusted for beginning another cycle of about ten operations.

I desire to comprehend within my invention such modifications as may be embraced within my claims and the scope of my invention.

Having thus fully described my invention, what I claim as new and desire to secure by Letters Patent, is:

1. In a water softener, a softening tank, a brine tank, an injector connected to said tanks having a cylindrical member with a Venturi plug in one end and a second plug in the other end spaced from the Venturi plug, said second plug having a small opening leading to the space between the plugs, said cylindrical member having two openings into the space between the plugs at right angles to the small opening in the second plug, a hard water source having a connection arranged to operate the injector whereby brine is drawn from the brine tank into the softening tank, a second connection from the hard water source adapted to furnish water through one of the right-angle openings of the injector to the space between the plugs to counteract the injector action and to refill the brine tank and wash the softening tank, and manually-operated means for opening said second connection.

2. In a water softener, a softening tank, a brine tank, an injector connected to said tanks having a casing, a Venturi member in said casing and a second member in said casing spaced from said Venturi member, said second member having an opening therein leading to the space between said members and said casing having two openings leading into the space between said members and at right angles to the opening in said second member, a hard water source having a connection arranged to operate the injector whereby brine is drawn from the brine tank into the softening tank, a second connection from the hard water source adapted to furnish water through one of the right-angle openings of the injector to the space between the spaced members to counteract the injector action and to refill the brine tank and wash the softening tank, and manually-operated means for opening said second connection.

3. In a water softener, a softening tank, a brine tank, an injector connected to said tanks having a casing, a Venturi member in said casing and a second member in said casing spaced from said Venturi member, said second member having an opening therein leading to the space between said members and said casing having two openings leading into the space between said members and at right angles to themselves and to said opening in said second member, the openings in said casing being larger than the opening in said second member, a hard water source having a connection arranged to operate the injector whereby brine is drawn from the brine tank into the softening tank, a second connection from the hard water source adapted to furnish water through one of the right-angle openings of the injector to the space between the spaced members to counteract the injector action and to refill the brine tank and wash the softening tank, and manually-operated means for opening said second connection.

ARTHUR C. ZIMMERMAN.